(No Model.) 3 Sheets—Sheet I.

J. H. SWIHART.
SPRING BALANCE SCALE.

No. 559,110. Patented Apr. 28, 1896.

WITNESSES
Lester L. Allen
Belle McCarty

J. H. Swihart
INVENTOR
By R. J. McCarty
ATTORNEY (No Model.) 3 Sheets—Sheet 2.
J. H. SWIHART.
SPRING BALANCE SCALE.
No. 559,110. Patented Apr. 28, 1896.
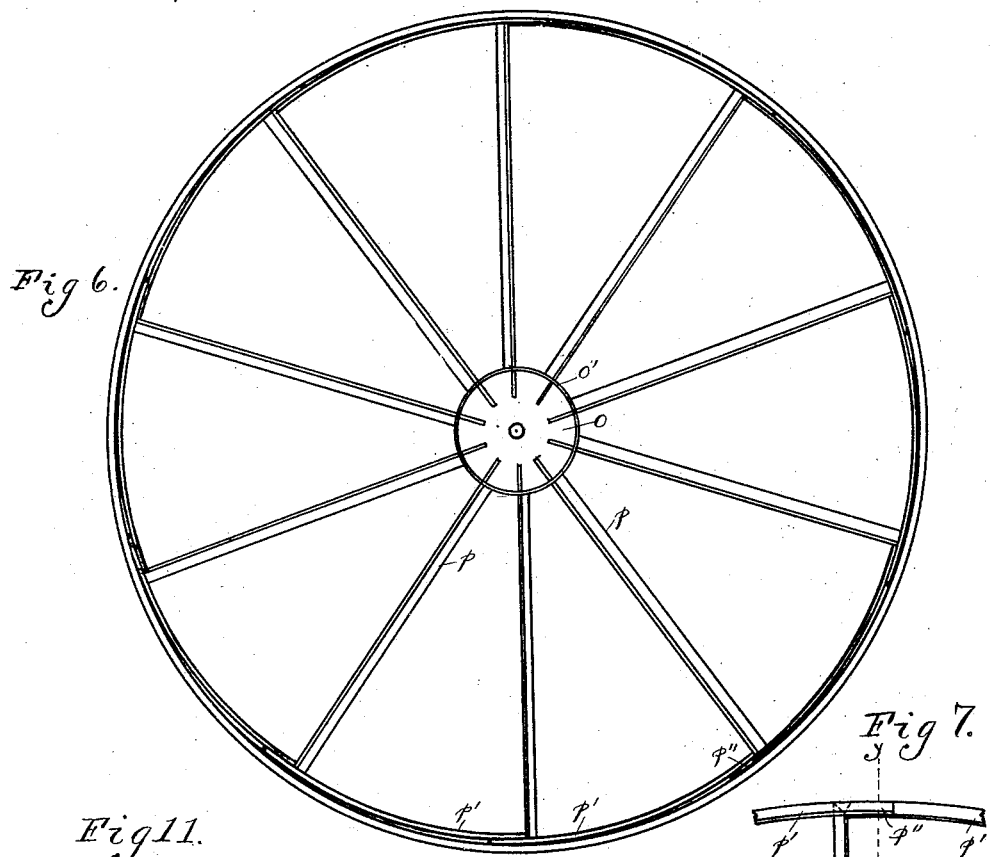
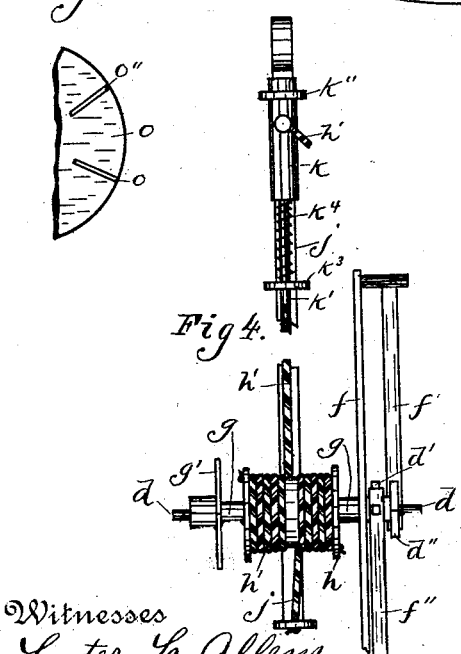
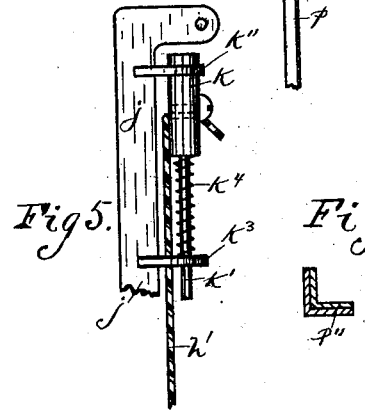
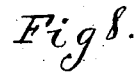
Witnesses
Lester L. Allen
Belle McCarty
By R. J. McCarty
Attorney
J. H. Swihart
Inventor
ANDREW B.GRAHAM. PHOTO-LITHO. WASHINGTON, D.C.

(No Model.) 3 Sheets—Sheet 3.
J. H. SWIHART.
SPRING BALANCE SCALE.
No. 559,110. Patented Apr. 28, 1896.
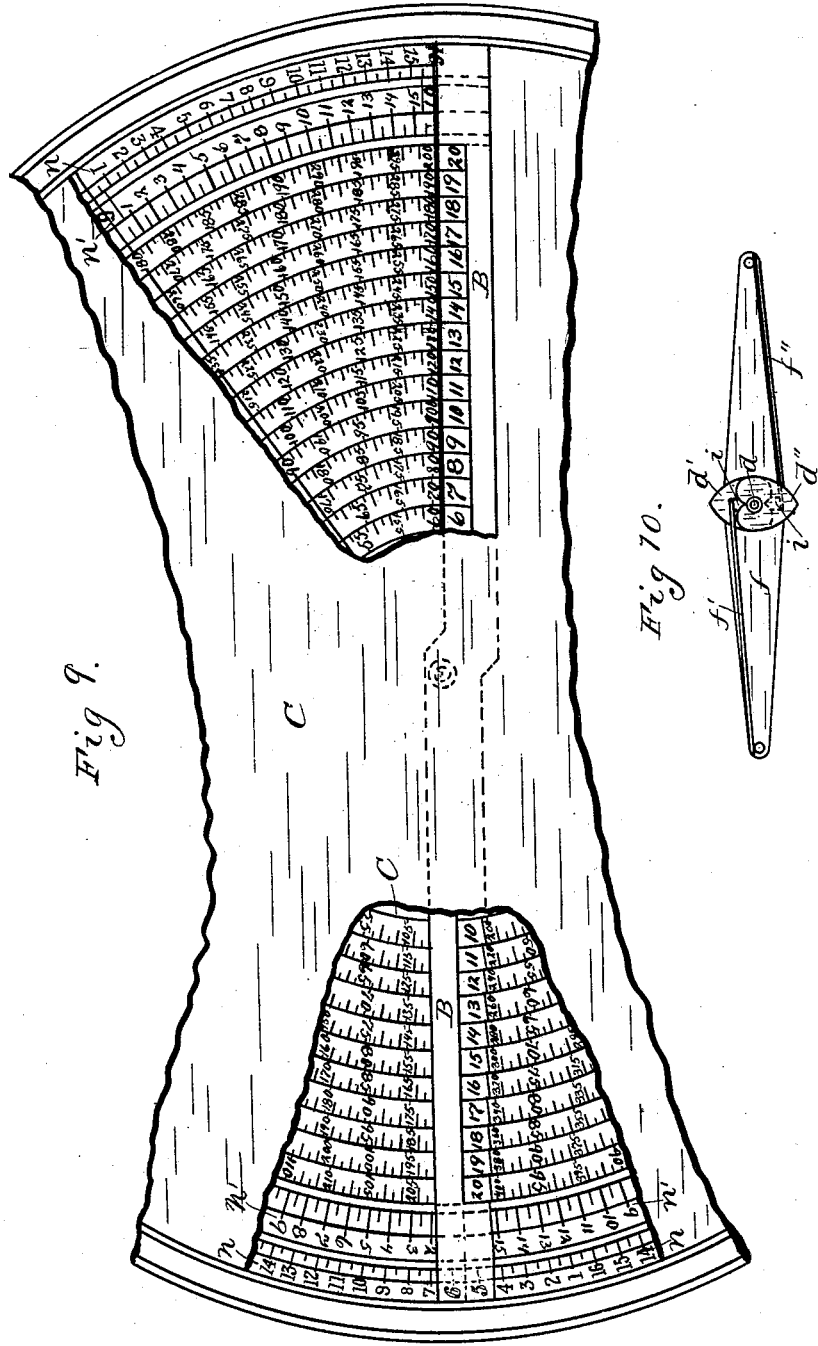
Witnesses
Lester L. Allen
Belle McCarty
J. H. Swihart,
Inventor
By R. J. McCarty,
Attorney

UNITED STATES PATENT OFFICE.

JOHN H. SWIHART, OF DAYTON, OHIO.

SPRING-BALANCE SCALE.

SPECIFICATION forming part of Letters Patent No. 559,110, dated April 28, 1896.

Application filed April 5, 1895. Serial No. 544,574. (No model.)

*To all whom it may concern:*

Be it known that I, JOHN H. SWIHART, of Dayton, county of Montgomery, State of Ohio, have invented a new and useful Improvement in Spring-Balance Scales; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to spring-balance computing-scales.

The object of the invention is to further improve the scale shown and described by me in a pending application for United States Letters Patent, filed October 26, 1894, Serial No. 527,095.

The improvements have reference to more efficient means for taking up the tare weight, to the dial-actuating mechanism, to a dial having a double computing and weighing capacity, and to the construction of the frame upon which said dial is mounted.

Figure 1:
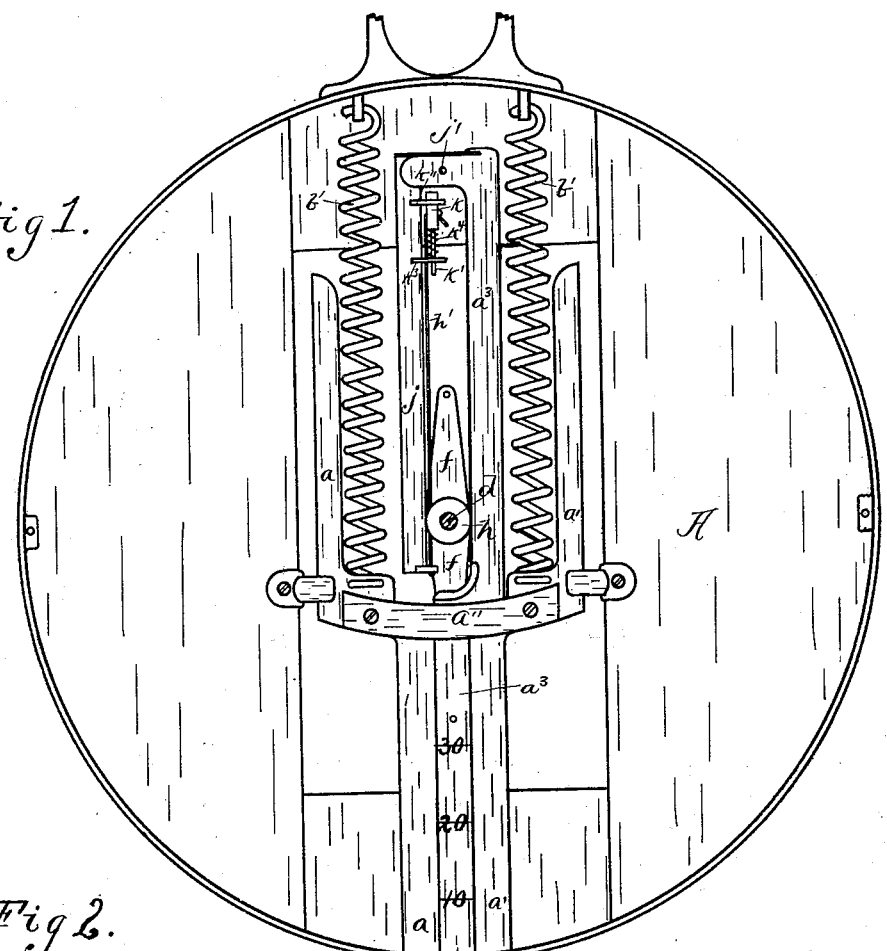
Figure 2:
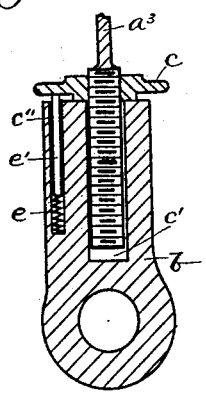
Figure 3:
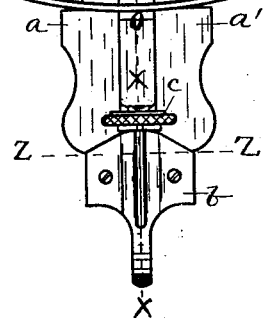

Referring to the annexed drawings, forming a supplemental part of this application and upon which similar letters of reference indicate corresponding parts, Figure 1 is a front elevation of the scale with the computing-dial removed; Fig. 2, a section on the line $x$ $x$ of Fig. 1; Fig. 3, a section on the line $z$ $z$ of Fig. 1; Fig. 4, an enlarged detached detail view of the dial-actuating mechanism; Fig. 5, a similar view in side elevation of the upper portion of the dial-actuating mechanism; Fig. 6, a view of the rear side of the dial-frame; Fig. 7, an enlarged detail of a part of the dial-frame; Fig. 8, a section on the line $y$ $y$ of Fig. 7; Fig. 9, an enlarged view of a portion of the computing-dial; Fig. 10, a detached detail view of the cam devices; Fig. 11, a detached detail view of a portion of the hub of the dial-frame.

$a$ $a'$ designate sliding bars attached to a transverse plate or cleat $a''$ and having their lower ends inserted in a plate $b$ and rigidly attached thereto. These bars, as usual, are normally controlled by open spiral springs $b'$.

$a^3$ designates an intermediate sliding bar movable with the bars $a$ $a'$. The lower end of said bar $a^3$ enters a central opening $c'$ in the plate $b$ and is screw-threaded to engage with a thumb-nut $c$, the function of which is to adjust said bar to take up the tare or weight of the crock or other article that is placed upon the scale-pan to receive the article sold, and the manner of taking up the tare does not differ from that described in the pending application hereinbefore referred to.

$c''$ designates a small opening in the plate $b$, that may be in the rear or front of the opening $c'$, and provides a seat for a spiral spring $e$, upon which a small cylindrical bar $e'$ rests. The spring normally presses this bar against the under side of the thumb-nut $c$ away from the center, as shown in Fig. 2, and acts as a lock to hold said nut in a fixed position and thereby prevents any lost or unnecessary motion, and, further, by applying the spring-pressure to the nut $c$ instead of directly to the bar $a^3$ a more even and systematic contraction of the spring $e$ is obtained, and said spring is maintained in a serviceable condition for an indefinite time.

The dial-actuating mechanism is to some extent the same as that shown and described in the application hereinbefore referred to, and consists of an arbor $d$, the ends of which are journaled in the plate A and in the price-per-pound bar B, respectively. Upon one end of the arbor $d$ are fixed cams $d'$ and $d''$. Springs $f'$ $f''$, mounted on a plate $f$, carry teeth $i$, that rest on the peripheries of said cams. The plate $f$ is mounted on an end of the sleeve $g$, and said sleeve incloses the arbor $d$. The other end of the sleeve has a plate $g'$ attached thereto, to which is attached the computing-dial C.

$h$ designates a spool rigidly mounted on the sleeve, or it may be an enlarged part of said sleeve. $h'$ is a cable or analogous device, preferably catgut, suitably wound around said spool to rotate the same in either direction under the action of the sliding bars. One end of this cord or cable is secured to the lower end of a bar $j$, that has a pivotal connection at $j'$ to the upper end of the intermediate bar $a^3$. The other end of said cord is secured to a short cylindrical bar $k$, that has a reduced portion or stem $k'$, both of which parts are loosely inclosed in guides $k''$ and $k^3$, that project from the bar $j$. The stem $k'$ is inclosed by a spiral spring $k^4$, which rests upon the lower guide $k^3$ and exerts a pressure on the part $k$ to take up any slack in the cord or cable that may be caused from excessive use.

The computing-dial C has two outer circles $n$ and $n'$ containing numerals that indicate the weights of any article or quantity of goods from a half of an ounce to twenty pounds. The figures in these circular columns are preferably shown in contrasting colors and are readable on the right and left side of the dial, as shown in Fig. 9—that is to say, the figures in the outer circle $n$ are red and are readable on the left of the dial on a line with the lower edge of the bar B, while the figures in the inner circle $n'$ are black and are readable on the right of the dial on a line with the upper edge of the bar B. The figures and indices in the radial lines indicate the values, and each alternate line is also shown in contrasting colors, preferably red and black, those in red being readable on the left of the dial and those in black on the right. In the first revolution of the dial weights up to ten pounds and the values thereof are read in black figures on the right, and weights in excess of ten pounds and the values thereof are read in the contrasting color on the left of the dial in the second revolution of said dial. When the figure "10" on the intermediate sliding bar $a^3$ appears at the lower edge of the plate A, where the zero-mark is now shown in Fig. 1, "10" will appear on a line with the price-per-pound bar B on the right of the dial in black. The reading of said dial is then transferred to the left, and weights and values of an additional ten pounds are shown in red.

The frame upon which the dial is mounted combines both strength and lightness, and consists of a center disk or hub $o$, constructed of sheet metal, with an annular flange $o'$ and a series of radial slots $o''$, in which the inner ends of a series of spokes $p$ are inserted and soldered. These spokes are constructed of sheet metal and are given a desired strength by being formed angular in cross-section, as shown in Fig. 8. The outer ends of said spokes terminate at a right angle or in curved portions $p'$, each of which joins with the next adjacent spoke, as at $p''$, Fig. 7, and the joints are soldered. When the spokes and hub are so united, the curved parts $p'$ form a complete rim in which a strip of ratan, wire, or any suitable substance is placed and made secure to provide means for the attachment of the computing-dial.

The zero-mark and figure "10" are placed directly on the bar $a^3$ and not on a plate attached to said bar, as in my former application. Therefore the bar is relieved of that much unnecessary weight. In adjusting the scale to take up the tare weight it is convenient to gage said adjustment by the position of the zero-mark on said bar.

I claim—

1. In a spring-balance scale, a revoluble computing-dial provided with two outer concentric rows of numerals denoting units of weight, the figures in one row being readable at a point on said dial diametrically opposite the point from which the figures on the other row are readable, a series of inner concentric rows of figures inclosed by said outer rows, indicating the money value of goods, one series of said numerals being readable at one point of the dial, and the other series of said numerals being readable at a diametrically-opposite point on said dial, and a stationary bar extending horizontally across said dial having two corresponding series of numerals indicating prices per pound of various goods, the figures on one part of said bar being used in connection with one series of figures on the dial, and the figures on the other part of said bar being used in connection with the other series of figures on the dial, substantially as described.

2. In a spring-balance scale, the combination of a revoluble computing-dial provided with two series of figures denoting weight and two series of figures denoting computed values, one of said series denoting weight and one of said series denoting value being readable at one point of the dial during the first revolution of said dial, and the other series of figures denoting weight and value being readable at a diametrically-opposite point during the second revolution of said dial, a stationary bar having two series of figures one of each being adapted to be used with each of the respective series of figures on the dial, substantially as described.

3. In a spring-balance scale, a computing-dial having two outer concentric circles provided with figures denoting weights, the figures in one circle contrasting in color with those in the other circle, a series of radial lines of figures inclosed by said outer circles and denoting values, each alternate line being also in contrasting colors, the figures in one color being readable at one point of the dial, and those in the contrasting color being readable at another point of said dial, and a bar indicating prices per pound adjacent to said dial, substantially as described.

4. In a spring-balance scale, the combination with a computing-dial, of a frame upon which said dial is mounted consisting of a center disk or hub provided with a series of radial slots, a series of spokes inserted in said slots, and having their outer ends terminating in curves to overlap each other, substantially as described.

5. In a spring-balance computing-scale, the combination with sliding bars, and a thumb-nut engaging with one of said bars, of a plate in which the lower ends of said bars are mounted, an eccentric opening in said plate, and a spring-pressed bar mounted in said eccentric opening, and adapted to normally press on said thumb-nut, substantially as described.

6. In a spring-balance scale, the combination with an arbor, cams and a computing-dial mounted on said arbor, a sleeve-carrying device operating with said cams, of a spool on said sleeve, a bar adjacent to said sleeve, guides projecting from said bar, a spring-pressed bar mounted in said guides, and a cable or analogous device wound around said spool and attached to said bars, substantially as described.

7. In a spring-balance computing-scale, the combination with sliding bars, an arbor, a sleeve inclosing said arbor, and cam devices on said sleeve and arbor, of a spool rigidly mounted on said sleeve, a pivotal bar $j$ adjacent to said spool, guides projecting from said bar, a bar $k$ mounted in said guides, a spring $k^4$ upon which said bar $k$ rests, and a cable surrounding said spool and attached to the bars $j$ and $k$, substantially as described.

In testimony whereof I have hereunto set my hand this 1st day of April, 1895.

JOHN H. SWIHART.

Witnesses:
R. J. McCARTY,
CHARLES H. KUMLER.